US010430586B1

(12) United States Patent
Paithane et al.

(10) Patent No.: US 10,430,586 B1
(45) Date of Patent: Oct. 1, 2019

(54) METHODS OF IDENTIFYING HEAP SPRAY ATTACKS USING MEMORY ANOMALY DETECTION

(71) Applicant: FireEye, Inc., Milpitas, CA (US)

(72) Inventors: Sushant Paithane, Sunnyvale, CA (US); Sai Omkar Vashisht, Morgan Hill, CA (US)

(73) Assignee: FireEye, Inc., Milpitas, CA (US)

( * ) Notice: Subject to any disclaimer, the term of this patent is extended or adjusted under 35 U.S.C. 154(b) by 265 days.

(21) Appl. No.: 15/258,993

(22) Filed: Sep. 7, 2016

(51) Int. Cl.
*G06F 21/56* (2013.01)
*G06F 3/06* (2006.01)
*H04L 29/06* (2006.01)

(52) U.S. Cl.
CPC ............ *G06F 21/566* (2013.01); *G06F 3/062* (2013.01); *G06F 3/0631* (2013.01); *G06F 3/0653* (2013.01); *G06F 3/0673* (2013.01); *H04L 63/145* (2013.01); *G06F 2221/034* (2013.01)

(58) Field of Classification Search
USPC ........................................................ 726/23
See application file for complete search history.

(56) References Cited

U.S. PATENT DOCUMENTS

| 5,483,621 | A * | 1/1996 | Ohtaka | G06F 3/1297 358/1.11 |
| 8,788,785 | B1 * | 7/2014 | Mann | G06F 21/52 711/172 |
| 9,202,054 | B1 * | 12/2015 | Lu | G06F 21/566 |
| 9,336,386 | B1 * | 5/2016 | Qu | G06F 21/55 |
| 9,438,623 | B1 * | 9/2016 | Thioux | G06F 21/52 |
| 9,548,990 | B2 * | 1/2017 | Lu | G06F 21/566 |
| 9,584,550 | B2 * | 2/2017 | Qu | G06F 21/55 |
| 9,804,800 | B2 * | 10/2017 | Livne | G06F 3/0622 |
| 9,904,792 | B1 * | 2/2018 | Badishi | G06F 21/62 |
| 2009/0165131 | A1 * | 6/2009 | Treadwell | G06F 21/566 726/22 |
| 2010/0037033 | A1 * | 2/2010 | Karecha | G06F 21/552 711/217 |
| 2010/0205674 | A1 * | 8/2010 | Zom | G06F 21/552 726/25 |

(Continued)

FOREIGN PATENT DOCUMENTS

CN 1545023 A * 11/2004

*Primary Examiner* — Taghi T Arani
*Assistant Examiner* — Badri Narayanan Champakesan
(74) *Attorney, Agent, or Firm* — Rutan & Tucker, LLP

(57) ABSTRACT

A non-transitory storage medium including instructions that are executable by one or more processors to perform operations including instrumenting a VM is shown. The VM is used to process an object to determine whether the object is associated with malware. Logic within the VM analyzes memory allocated for a process within the VM for a point of interest (POI), the POI being an address of one of a set predetermined instructions likely to be associated with malware. The VMM detects a memory violation during processing of the object and responsive to detecting the memory violation, injects a transition event at the POI on the page on which the POI is located in memory. Further, responsive to detecting an attempted execution of the transition event, the VMM (i) emulates an instruction located at the POI, and (ii) the logic within the VM performs one or more malware detection routines.

26 Claims, 4 Drawing Sheets

(56) References Cited

U.S. PATENT DOCUMENTS

| | | | |
|---|---|---|---|
| 2012/0144486 A1* | 6/2012 | Navaraj | G06F 21/52 726/23 |
| 2014/0123283 A1* | 5/2014 | Liu | G06F 21/566 726/23 |
| 2014/0123284 A1* | 5/2014 | Liu | G06F 21/53 726/23 |
| 2014/0351935 A1* | 11/2014 | Shao | G06F 21/566 726/23 |
| 2015/0096025 A1* | 4/2015 | Ismael | G06F 21/566 726/23 |
| 2016/0004861 A1* | 1/2016 | Momot | G06F 21/552 726/23 |
| 2016/0112446 A1* | 4/2016 | Lu | G06F 21/566 726/23 |
| 2016/0231961 A1* | 8/2016 | Shin | G06F 3/0629 |
| 2016/0328560 A1* | 11/2016 | Momot | G06F 21/563 |
| 2016/0358670 A1* | 12/2016 | Son | G11O 29/38 |
| 2017/0091070 A1* | 3/2017 | Denise | G06F 11/3612 |
| 2017/0098476 A1* | 4/2017 | Hong | G11O 29/1201 |

\* cited by examiner

METHODS OF IDENTIFYING HEAP SPRAY ATTACKS USING MEMORY ANOMALY DETECTION

FIELD

Embodiments of the disclosure relate to the field of cybersecurity. More specifically, one embodiment of the disclosure relates to a method, system, and apparatus for detecting heap spray-based malware attacks.

GENERAL BACKGROUND

Over the last decade, cybersecurity attacks have become a pervasive problem for internet users as many network devices and other resources have been subject to attack and compromised. In particular, a technique known as "heap spray" allows malicious software sometimes referred to as malware or an exploit residing within a network device to perpetrate a cybersecurity attack. During a heap spray attack, an exploit inserts a portion of code, for example, a sequence of No Operation (NOP) instructions and a sequence of bytes at a random location within process address space of the network device. The sequence of bytes may be directed at performing malicious activity, wherein the sequence of bytes may be in the form of code, commonly referred to as "shellcode." This location may a memory location within a heap (e.g., a predetermined amount of virtual memory allocated for the software). Once shellcode has been inserted into the heap, the exploit may be triggered during processing which causes the application to execute the shellcode thereby allowing the exploit to assume control of the execution of code within the memory of the network device. This process of assuming control of execution enables the attacker to execute instructions on the network device which may be malicious or anomalous to the network device, to its content or to the owner of the network device. Heap spray attacks use chunks of No Operation (NOP) instructions, also known as NOP sleds, to facilitate the execution of the shellcode. By orienting a NOP sled at an address just prior to shellcode, the execution flow of the processing unit of the network device is quickly directed to the shellcode.

The NOP instructions may be a sequence of known instructions (e.g., "patterns"). Conventional heap spray detection methods attempt to identify heap spray attacks by detecting the NOP sleds and comparing the sequence of NOP instructions to NOP instructions appearing on a list of permitted (and non-malicious) NOP instructions. Such a list may be referred to as a "whitelist" of NOP instructions. Those sequences of NOP instructions found on the whitelist are dismissed as non-malicious. However, those sequences of NOP instructions found in the heap but not found on the whitelist are flagged as a probable NOP sled portion of a heap spray attack. Alternatively, sequences of NOP instructions may be compared to a "blacklist" of NOP instructions, wherein NOP instructions found on the blacklist may be considered malicious.

Several issues with a detection strategy using a whitelist and/or blacklist of NOP instructions exist. First, comparing sequences of NOP instructions to NOP instructions appearing on a whitelist may result in a high number of false positives as a whitelist rarely contains all possible permitted or non-malicious NOP instructions. Several non-malicious NOP instructions not appearing on the whitelist may reside in received network traffic. This in turn prompts the detection system to improperly flag one or more objects within the network traffic as containing or, viewed differently, instigating, when processed, a heap spray attack and return a false positive to a network administrator. Second, as false positives are reported, the NOP instruction that caused the false positive is typically added to the whitelist in order to prevent future false positives based on that particular non-malicious NOP instruction. However, a whitelist of all possible non-malicious NOP instructions is untenable because such as list would require constant updating.

Similarly, numerous false positives may result from comparisons with a blacklist. For instance, a sequence of instructions may differ in an inconsequential manner (e.g., changing of one or two instructions) from a NOP sequence appearing on a blacklist, wherein the difference results in the sequence of instructions not being flagged as malicious while performing the same function when executed as a NOP sequence appearing on the blacklist.

Therefore, the efficacy of heap spray detection systems using comparisons to either blacklists or whitelists is limited by the number of known malicious and non-malicious patterns, respectively. As a large number of permutations exists wherein one or more instructions or bytes are altered (e.g., order of one or more instructions swamped, or one or more instructions replaced with one or more alternative instructions) such that the alteration to the pattern does not change the functionality of the pattern, such heap spray detection systems may prove to be ineffective.

However, if too many patterns are used in a heap spray detection algorithm, the detection process may take a considerable amount of time and fail to return a result within the allotted time for the whitelist or blacklist comparison. Furthermore, while the detection process is attempting to perform such a comparison, a heap spray attack may be executing and consuming a large amount of memory and CPU resources and; therefore, further impede the speed of the detection process.

Another disadvantage to current heap spray detection systems is that numerous patterns appearing on blacklists as NOP sequences are common in non-malicious objects, resulting in false positives. For example, non-malicious PowerPoint objects may include several large regions of the same instructions that may trigger a comparison with a pattern on a blacklist. However, the large regions of the same instructions may merely represent the background of the slide. Therefore, current detection systems may flag this non-malicious PowerPoint object resulting in a false positive.

Additionally, content appearing as part of a heap spray attack is not always consistent within a memory heap, thus, the location of such content is rarely predictable. Therefore, heap spray detection systems that rely on scanning at predetermined locations for predetermined patterns may encounter numerous false negatives.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
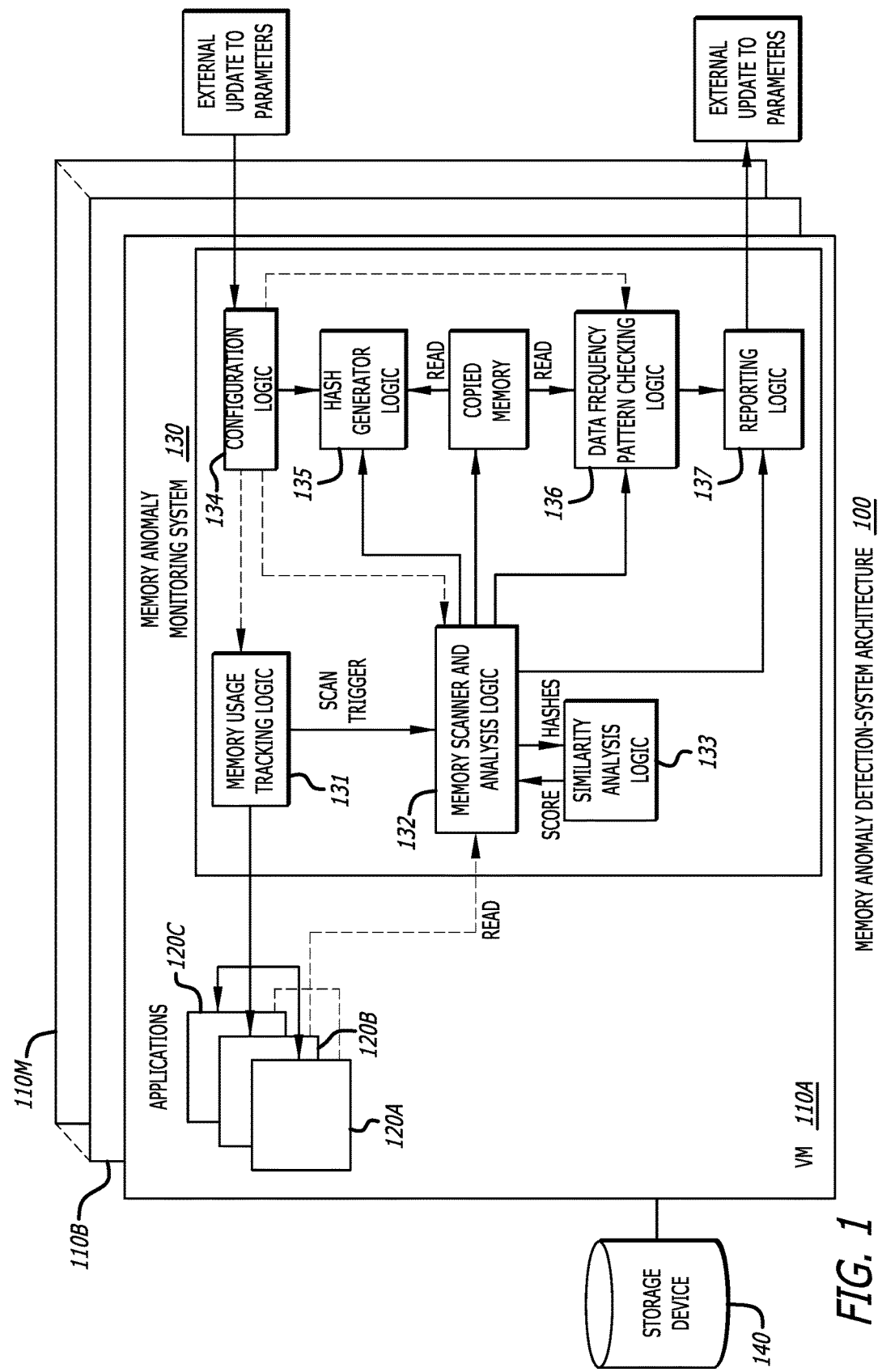
FIG. 1 is an exemplary block diagram of an exemplary architecture of the memory anomaly detection system 100 including one or more virtual machines 110A-110M.

Various embodiments of the disclosure relate to determining whether an object received as part of network content or other digital content is attempting to utilize a heap spray attack in efforts to increase the likelihood of successfully implementing a cybersecurity attack. The determination entails an analysis of memory allocation for a process (that is, an application executing or otherwise running within a runtime environment within a virtual machine or other network device, followed by a similarity analysis of content within a plurality of memory regions allocated for the process, or portions thereof, and detection of highly similar content within the plurality memory regions or a portion of the plurality of memory regions. One or more memory regions containing highly similar content often evidence (have a high correlation with the occurrence of) the presence of a heap spray attack.

More specifically, an embodiment using a memory anomaly detection system may employ the following technique: first, monitor memory allocation of a running process for allocation exceeding a first memory threshold, e.g., by querying the process itself or the operating system.

Second, when memory allocation has exceeded the first memory threshold, the embodiment determines whether (i) an abnormally large memory region having a size (e.g., in bytes) has been allocated for a single process, or (ii) at least a threshold number of memory regions having corresponding sizes has been allocated for the process. An abnormally large memory region may exceed a predetermined second memory threshold which may be dependent on, for example, the process under analysis and/or the operating system used in processing the object. When allocation of an abnormally large region has been detected or allocation of at least the threshold number of memory regions having corresponding sizes has been detected. Specifically, the term "corresponding size" should be interpreted herein as being either (1) an exact same size (e.g., two memory regions include the same number of bytes) or (2) substantially the same size such that a number of bytes included in a first memory region is within a predetermined threshold of the number of bytes includes in a second memory region. The predetermined threshold may be expressed as a number of bytes or a percentage. Third, the embodiment selects a subset from either the abnormally large region or the memory regions allocated having corresponding sizes for further analysis.

Fourth, the embodiment performs a similarity analysis on at least a portion of one or more of the selected subset of memory regions, wherein the similarity analysis may include performing a fuzzy hash to generate a hash list, applying one or more similarity checks to entries in the hash list and generating a similarity score. When the similarity score exceeds a score threshold, the embodiment may report the memory allocation that triggered the further analysis (e.g., the similarity analysis) along with an analysis report and score Additional or alternative embodiments may perform, e.g., concurrently (at least partially overlapping in time) with step three, a data frequency analysis on at least a portion of a memory region within the selected subset to detect a repeating pattern. When a repeating pattern is detected, the embodiment may report the repeating pattern and the offset of the first occurrence of the pattern. The performance of the data frequency analysis serves numerous purposes and has several advantages, including, but not limited or restricted to, (i) identifying which bytes, patterns and/or single byte NOPs occurred, (ii) facilitating compatibility with alternative systems, especially those utilizing whitelists/blacklists but identifying patterns up to DWORD length, and (iii) assisting in mitigating the occurrence of false positives by obtaining a similarity score, the patterns detected and their percentages enables the system to reduce false positives.

Embodiments of the invention may be employed by or take the form of a network device or apparatus implementing a threat detection and prevention (TDP) system. The TDP system may be (i) implemented or executed as software, (ii) a dedicated cybersecurity appliance or general purpose computer system, (iii) deployed within a cloud-computing environment, and/or (iv) deployed within a cluster environment. An alternative embodiment of the invention may be implemented by an endpoint device, e.g., a server or client device or other system coupled for communication over a network, as a network node, and often under user control. The endpoint device in this embodiment includes a runtime agent or other facility to monitor its processing of objects, without requiring a special runtime environment established by a virtual machine for that purpose.

If evidence of a heap spray attack is uncovered, the object may be classified as "suspicious," when, for example, the evidence of the attack is associated with a first probability that the object is associated with a malicious attack, or "malicious," when, for example, a second probability that the object is associated with a malicious attack, the second probability being higher than the first probability. The associated probabilities may be based on machine learning and/or experiential knowledge related to prior heap spray attacks.

While specific embodiments are described herein, the invention is not to be limited to these embodiments, the invention is to be understood as not limited by the specific embodiments described herein, but only by scope of the appended claims. Features and details from one or more described embodiments may also be combined, added or removed to form other embodiments within the scope of the invention, as the described embodiments are merely exemplary of various features.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity (e.g., a tool) that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software to cause a network device or other portions of a network to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

The term "process" may include an instance of a computer program (e.g., a collection of instructions, also referred to herein as an application). In one embodiment, the process may be comprised of one or more threads executing concurrently (e.g., each thread may be executing the same or a different instruction concurrently).

The term "processing" may include execution of a binary or launching an application wherein launching should be interpreted as placing the application in an open state and, in some implementations, performing simulations of actions typical of human interactions with the application. For example, the application, an internet browsing application, may be processed such that the application is opened and actions such as visiting a website, scrolling the website page, and activating a link from the website are performed (e.g., the performance of simulated human interactions).

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and potentially allow the object to be categorized or typed as malware. In one embodiment, an object may include a binary file that may be executed within a virtual machine. Herein, the terms "binary file" and "binary" will be used interchangeably.

The term "network device" may be construed as any intelligent electronic device with the capability of connecting to a network. Such a network may be a public network such as the internet or a private network such as a wireless data telecommunication network, wide area network, a type of local area network (LAN), or a combination of networks. Examples of a network device may include, but are not limited or restricted to, a laptop, a server, a dedicated cybersecurity appliance, general purpose computer system a mobile phone, a tablet, etc.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access, without the appropriate permissions, memory allocated for the application during processing, and/or (vii) other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting heap spray attacks or memory allocation anomalies typically known to be associated with heap spray attacks. As this invention is susceptible to embodiments of many different forms, it is intended that the present disclosure is to be considered as an example of the principles of the invention and not intended to limit the invention to the specific embodiments shown and described.

II. Memory Anomaly Detection System

1. Architecture

FIG. 1 is an exemplary block diagram of an exemplary architecture of the memory anomaly detection system 100 employed within a network appliance (e.g., a TDP discussed above) that includes one or more virtual machines (VMs) 110A-110M. The memory anomaly detection (MAD) system 100 may include the one or more virtual machines 110A-110M, wherein each of the one or more virtual machines 110A-110M includes: (i) one or more applications 120A-120C; and (ii) a memory anomaly monitoring system 130, which may include a memory usage tracking logic 131, a memory scanner and analysis logic 132, a similarity analysis logic 133, a configuration logic 134, a hash generator logic 135, a data frequency pattern checking logic 136, and a reporting logic 137. Each VM within the MAD system 100, for example, the VM 110A, may be configured with at least one of the available software profiles corresponding to the software images stored within storage device 140 that is appropriate for processing the object. Alternatively, the VMs 110A-110M may be configured according to a prevalent software configuration, software configuration used by a network device within a particular enterprise network, or an environment that is associated with the object to be processed, including software such as a web browsing application, PDF™ reader application, or the like. For example, a particular operating system and a particular version of an application may be used by the VMs 110A-110M, wherein the configuration includes one or more of the applications 120A-120C. Examples of the applications 120A-120C, include but are not limited or restricted to, email applications, document readers, word processor applications, spreadsheet applications, web browsing applications, etc.

In one embodiment, the MAD system 100 conducts an analysis of an object, for example, of a group of incoming objects by creating and executing processes of one or more applications 120A-120C to virtually process (e.g., execute) the object and monitors (e.g., tracks) memory allocation for each process. When the memory allocation for a single process meets or exceeds a first memory threshold, the memory usage tracking logic 131 of the memory anomaly monitoring system 130 analyzes the memory allocation for the process for either (1) an abnormally large memory region (e.g., in bytes), or (2) at least a threshold number of memory regions having corresponding sizes. In one embodiment, the first memory threshold is a predefined size used for comparison with the memory allocation of all processes. In a second embodiment, each particular application may have specified memory threshold such that the first memory threshold may vary for processes of different applications.

Upon conducting at least an analysis of the memory allocation for a process of an application running within the VM and determining the memory allocation meets or exceeds the first predetermined threshold, the memory scanner and analysis logic 132 analyzes the memory allocation for the process for: (i) an abnormally large memory region, and/or (ii) a threshold number of memory regions having corresponding sizes. More specifically, the memory scanner and analysis logic 132 queries the memory layout of a process (e.g., using one or more API calls) and applies one or more filters on the gathered metadata to create a "snapshot" (e.g., an overview) of memory regions applicable to the process. The memory scanner and analysis logic 132 then analyzes the snapshot to determine whether at least a threshold number of memory regions of corresponding sizes have been allocated for the process. When at least the threshold number of memory regions have been allocated for the process, and the cumulative size of allocated memory regions for the process meets or exceeds a predetermined size, a multiple regions allocation event is reported. Subsequently, an analysis of at least a subset of the memory regions having corresponding sizes is triggered, as will be discussed below.

Additionally, when a single memory region having a size (e.g., in bytes) above a predetermined threshold is detected for a process, a big region allocation event is reported. Subsequently, an analysis of the abnormally large region is triggered, as will be discussed below. In one embodiment, when (i) at least a threshold number of memory regions having corresponding sizes are detected, and (ii) a memory region having a size greater than a predetermined threshold is detected, an analysis of at least a subset of the memory regions having corresponding sizes is performed first. In a second embodiment, an analysis of the abnormally large memory region is performed first. In yet another embodiment, the two analyses may be performed concurrently.

When the memory scanner and analysis logic 132 detects at least a threshold number of memory regions having corresponding sizes, a subset of those regions is selected for a similarity analysis ("multiple region similarity analysis").

In an embodiment, the number of regions within the selected subset is a predetermined fixed number. In a second embodiment, the number of regions within the selected subset is dependent on the number of detected memory regions having corresponding sizes (e.g., a predetermined percentage of the number of detected memory regions, which may be less than or equal to 100%). In a first embodiment, a copy of the selected subset is made and a fuzzy hash algorithm is then used to process the entire contents of each memory region within the copy of the selected subset. In a second embodiment, a fuzzy hash algorithm is then used to process a portion of each memory region within the copy of the selected subset (e.g., the portion being less than the entirety of the contents of the memory region, for example 256 KB or 512 KB chunks of the memory regions within the selected subset). Additionally, in one embodiment, a plurality of threads may be used to perform the multiple region similarity analysis, wherein a separate thread performs a multiple region similarity analysis on each of the memory regions within the selected subset.

When the memory scanner and analysis logic 132 detects an abnormally large memory region, at least a portion of abnormally large memory region is selected for a similarity analysis ("abnormally large memory region similarity analysis"). More specifically, the abnormally large memory region is copied and the copy is divided into a plurality of smaller memory regions, each having of a predetermined size. A subset of the plurality of smaller memory regions is selected in the same manner as discussed above with respect to the detection of at least a threshold number of memory regions having corresponding sizes. A fuzzy hash algorithm is then used to process the selected subset. More specifically, the hash generator logic 135 reads the copy of the selected subset and performs a fuzzy hash algorithm on the copy of the selected subset. In one embodiment, performance of the fuzzy hash algorithm computes one or more fuzzy hashes. Fuzzy hash algorithms may be available commercially and in open source. As with the multiple region similarity analysis, a plurality of threads may be used to perform the abnormally large memory region similarity analysis.

Upon processing at least a portion of the contents within the selected subset of memory regions with a fuzzy hash algorithm (the multiple region similarity analysis and/or the abnormally large memory region similarity analysis), the resultant hashes are then analyzed for similarity by the similarity analysis logic 133 and a similarity score is generated. The similarity between the hashes of each of the memory regions within the selected subset represents the similarity in the contents of the memory regions under analysis. To generate a similarity score among the generated hashes, a distance table method is used. A distance table has a dimension equal to a hash count by a hash count. Specifically, the table holds the distances between all hash strings from all other hash strings. A difference score is computed by averaging these distances. A similarity score is then generated by converting the difference score to a percentage, (e.g., 100−difference score). The similarity between two hash strings may be determined using different distance types. For example, a first distance type may be a Hamming distance, which represents the number of positions at which corresponding symbols differ between two equal length strings (e.g., hashes). The use of the Hamming distance is intended to cover character substitutions within patterns among memory region (e.g., within potential NOP sleds). A second distance type may be a Levenshtein distance, which represents the number of deletions, insertions or substitutions required to transform a first string into a second string.

A third distance type includes a Damerau-Levenshtein distance, which represents the number of insertions, deletions, or substitutions, or a transposition of two adjacent characters to transform a first string into a second string. In one embodiment, the distance type used may be dependent on whether the hashes were generated via a multiple region similarity analysis or via an abnormally large memory region similarity analysis. For example, when the hashes were generated via a multiple region analysis, the Hamming distance type may be used as the multiple region analysis often encounters precise repetition of content; hence hash strings are almost identical. However, when the hashes are generated via an abnormally large memory region similarity analysis, sliding and/or mutating patterns were often observed, such that a Damerau-Levenshtein distance may be used to generate a similarity score. However, embodiments have been contemplated wherein one or more of the above-recited distance types have been used with the multiple region similarity analysis and the abnormally large memory region similarity analysis.

When a similarity score is above a predetermined percentage, e.g., 70% (wherein the percentage is configurable), a multiple region similarity event is reported when the hash is derived from a multiple region similarity analysis and a big region similarity event is reported when the hash is derived from an abnormally large memory region similarity analysis. In one embodiment, a similarity score above a predetermined percentage may indicate the object being processed within the VM is associated with a heap spray attack.

In addition to performance of the similarity analysis as discussed above, either prior to, following or currently, a memory region from the selected subset is selected for data frequency analysis. The data frequency analysis, performed by the data frequency pattern checking logic 136, includes computing the frequency of one or more blocks of bytes (a block may include one or more bytes and be referred to as a "byte grouping") within the selected memory region. Additionally, the data frequency pattern checking logic 136 may compute the percentage of bytes the byte grouping appears in the memory region, the offset of the first appearance of the byte grouping, and whether the byte grouping represents a single byte NOP instruction. In one embodiment, the data frequency pattern checking logic 136 may analyze the selected memory region of one or more byte groupings that may appear on a predetermined list.

In one embodiment, a data frequency analysis includes computing the frequency that a byte grouping occurs in a given buffer (e.g., a memory region). Additionally, the data frequency analysis may also generate the percentage with respect to a total buffer size (e.g. all memory regions within the selected subset) and determine the first relative offset of a first byte of the byte grouping in the selected subset. For each byte grouping in a data frequency list, which includes byte groupings analyzed during the data frequency analysis, the data frequency pattern checking logic 136 may check whether the byte grouping is a valid single byte x86 instruction. Furthermore, the data frequency pattern checking logic 136 generate byte patterns based on the data frequencies, wherein byte groupings less than or equal to the size of a DWORD are validated in the buffer and are reported in DWORD format. Herein, a DWORD has a length of 4 bytes, or 32 bits. In a second embodiment, longer patterns (e.g., QWORD length of 8 bytes/64 bits) may be ordered in first-offset order based on the occurrence of each byte grouping within the selected memory region. Additionally, byte groupings may have lengths other than those of 4 bytes and 8 bytes.

In one embodiment, wherein a multiple region analysis is performed, a data frequency analysis is computed one two memory regions: (i) on the memory region included in the selected subset that was allocated first in time; and (ii) on a memory region that was allocated at a second time (e.g., mid-way between the first allocation and the last allocation within the selected subset). When an abnormally large memory region analysis is performed, the data frequency analysis is computed on a memory region that was allocated at a second time. Alternative embodiments have been contemplated wherein a data frequency analysis is performed on one or more other memory regions than those indicated above, and the disclosure should not be limited. The results of the similarity analysis and/or the data frequency analysis may be stored within storage device 140 and/or provided to the reporting logic 137 for report generation.

The various predefined thresholds and/or sizes ("parameters") as discussed herein may be adjustable via the configuration logic 134. For example, the configuration logic 134 may receive external updates to one or more parameters thereby enabling dynamic configuration of the MAD system 100. In a second embodiment, the configuration logic 134 may receive external updates from a cloud computing environment (e.g., transmitted from a remote device via the cloud and/or uploaded to cloud storage and transmitted to the configuration logic 134 at a predetermined time).

Embodiments of the invention may be employed by or take the form of a network device implementing a threat detection and prevention (TDP) system, where the network device comprises a dynamic analysis engine, which deploys the memory allocation detection system. Further, the dynamic analysis engine may monitor and analyze behavior of objects during processing in a virtual machine of the memory allocation detection system. In some embodiments, the TDP system may be implemented or executed by a server or client device or other system (called an "endpoint") connectable to a network. In other embodiments, the TDP system may be a dedicated cybersecurity appliance or general purpose computer system. In yet embodiments, the TDP system may be deployed within a cloud-computing environment. The TDP system may include an optional static analysis engine as well as the dynamic analysis engine. According to one embodiment of the disclosure, the static analysis engine operates as a filter that analyzes information associated with characteristics of one or more objects extracted from monitored network traffic in efforts to determine if the characteristics are anomalous and thus indicative of an exploit. If so, the object(s) are labeled "suspicious." The dynamic analysis engine may include virtual execution logic to automatically process and analyze, without user assistance, content within object(s) of the received network traffic. Furthermore, the dynamic analysis engine may include monitoring logic to automatically instantiate an application to execute or otherwise process an object within received network traffic and analyze the memory allocation for the application and patterns of instructions stored therein in order to detect a heap spray attack in accordance with any of the techniques and embodiments described herein. The TDP system as discussed is discussed more in-depth in U.S. Pat. No. 9,438,623, which issued on Sep. 6, 2016, and is titled "Computer Exploit Detection Using Heap Spray Pattern Matching," and assigned to FireEye, Inc., the entire contents of which are incorporated herein by reference.

As mentioned above, an alternative embodiment of the invention may be deployed by an endpoint device that does not require one or more virtual machines. Thus, in such an embodiment, the monitoring of the memory allocation for one or more processes will be done during runtime. In one embodiment an endpoint device includes a runtime agent or other facility to monitor its processing of objects, without requiring a special runtime environment established by a virtual machine for that purpose. Further information regarding an embodiment of an agent may be had with reference to U.S. Pat. No. 8,949,257, which issued Feb. 3, 2015, and is entitled "Method and System for Collecting and Organizing Data Corresponding to an Event," the full disclosure of which being incorporated herein by reference.

2. Logical Representation

Figure 2:
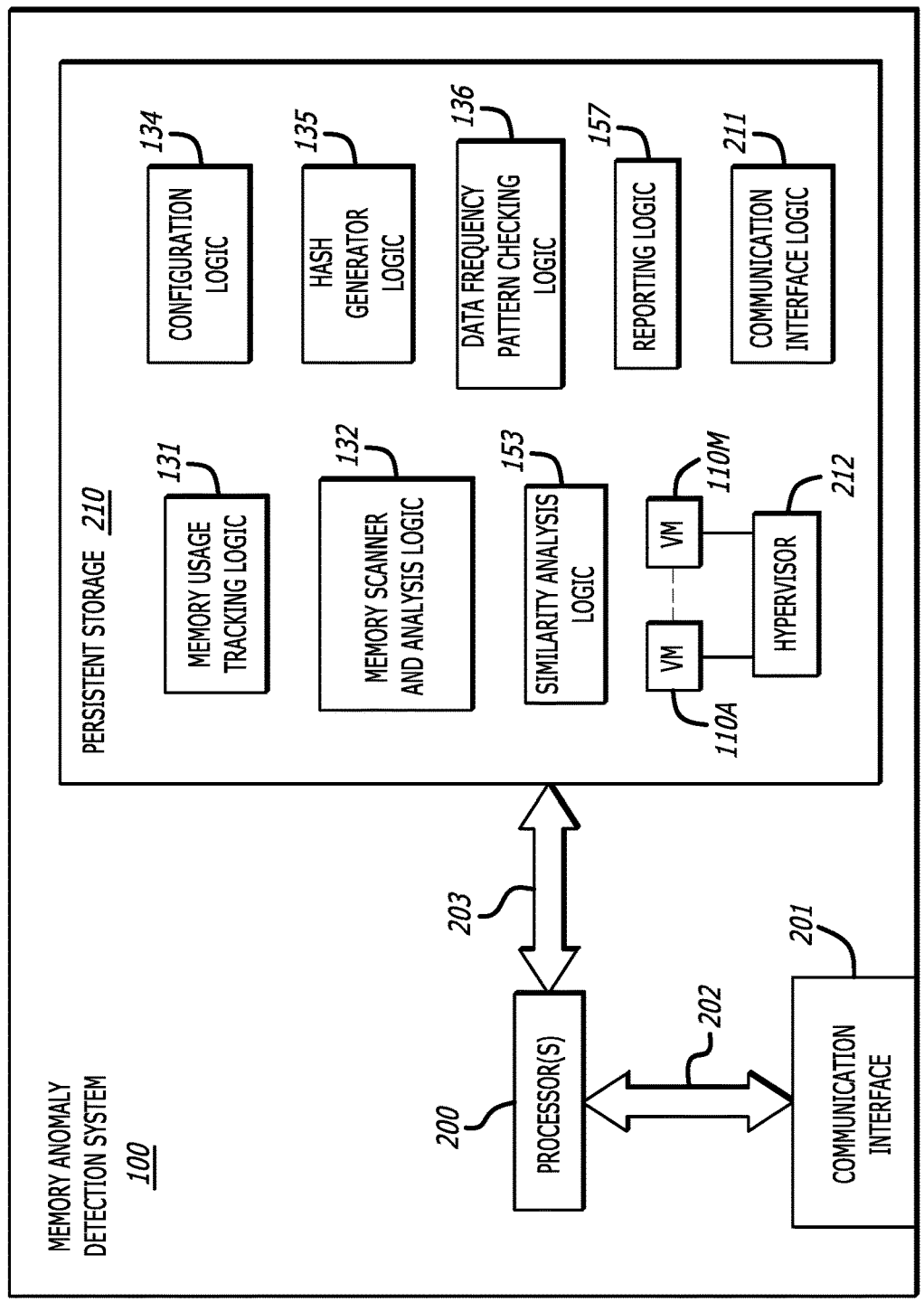
FIG. 2 is an exemplary embodiment of a logical representation of the memory anomaly detection system 100 of FIG. 1.

FIG. 2 is an exemplary embodiment of a logical representation of the memory anomaly detection (MAD) system 100 of FIG. 1. The MAD system 100 includes a housing, which is made entirely or partially of a hardened material (e.g., hardened plastic, metal, glass, composite or any combination thereof) that protect circuitry within the housing 200, namely one or more processors 200 that are coupled to a communication interface 201 via a first transmission medium 202. The communication interface 201, in combination with communication interface logic 211, enables communications with external network devices and/or other network appliances to receive updates for one or more of VM 110A-110M. According to one embodiment of the disclosure, the communication interface 201 may be implemented as a physical interface including one or more ports for wired connectors. Additionally, or in the alternative, the communication interface 201 may be implemented with one or more radio units for supporting wireless communications with other electronic devices. The communication interface logic 211 may include logic for performing operations of receiving and transmitting one or more objects via the communication interface 201 to enable communication between the MAD system 100 and one or more network devices via the a network (e.g., the internet or a LAN) and/or cloud computing services.

The processor(s) 200 is further coupled to persistent storage 210 via a second transmission medium 203. According to one embodiment of the disclosure, the persistent storage 210 may include (a) the memory usage tracking logic 131, (b) the memory scanner and analysis logic 132, (c) the similarity analysis logic 133, (d) the configuration logic 134, (e) the hash generator logic 135, (f) the data frequency pattern detection logic 136, (g) the reporting logic 137, and (h) the communication interface logic 211. Of course, when implemented as hardware, one or more of these logic units could be implemented separately from each other.

III. Memory Anomaly Detection Methodology

Figure 3:
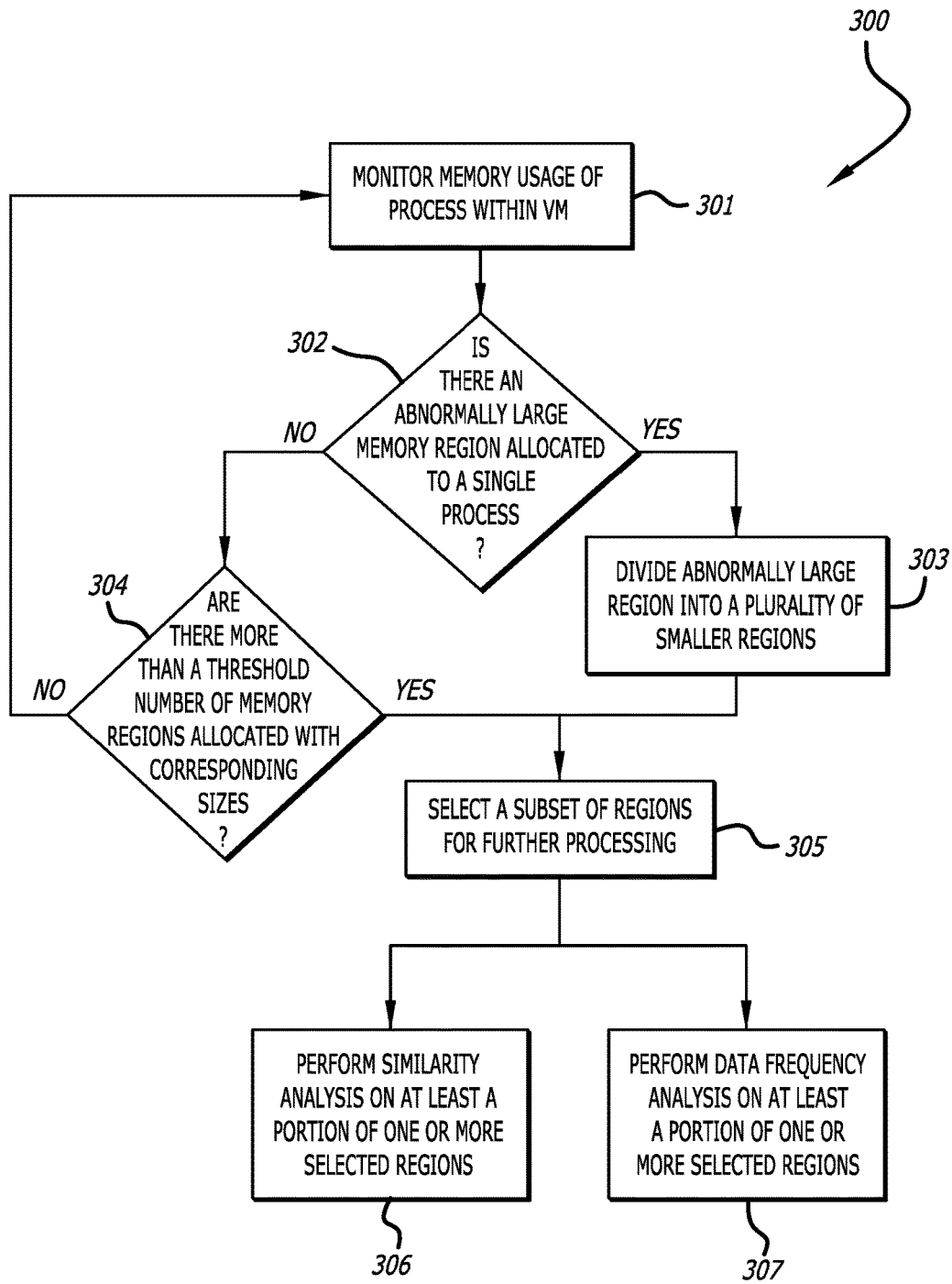
FIG. 3 is a flowchart illustrating an exemplary method for detecting a heap spray attack using a virtual machine to process a suspicious object within the memory anomaly detection system of FIG. 1.

FIG. 3 is a flowchart illustrating an exemplary method for detecting a heap spray attack using a virtual machine to process a suspicious object within the memory anomaly detection system of FIG. 1. Each block illustrated in FIG. 3 represents an operation performed in the method 300 of detecting possible heap spray attacks with the MAD system of FIG. 1. Referring to FIG. 3, the memory anomaly detection system receives network traffic and passes at least a portion of the network traffic (e.g., an object) to a virtual machine (e.g., virtual machine 110A of FIG. 1) within the MAD system 100 for processing and analysis. As discussed above, the MAD system 100 includes one or more virtual machines for processing an object and logic for monitoring and analyzing the object during processing, including at least monitoring behaviors associated with the processing of the object. In one embodiment, the processing of the object includes launching the object within a virtual machine, wherein one or more processes are initiated and require an allocation of memory from the operating system included within the configuration of the virtual machine. At block 301, logic within the MAD system 100 monitors the memory usage of one or more processes within the virtual machine. For example, the one or more processes may include all processes that have been initiated, or a subset of all processes that may be, for example, included in a predetermined listing of processes that are to be monitored. For the purpose of clarity, the term "a process," which refers to a single process, will be used to describe the operations of the method 300; however, the method 300 may include monitoring the memory allocation of a plurality of processes concurrently.

At block 302, while monitoring the memory allocation of the process, logic of the MAD system 100 determines whether an abnormally large memory region has been allocated for the process. An abnormally large memory region may refer to a memory region having a size (e.g., in bytes) of at least a predefined size. In one embodiment, the size of the abnormally large memory region may be a predefined constant for all processes being monitored. In a second embodiment, the size of the abnormally large memory region may correspond to the process being monitored, e.g., a first size may not be abnormally large, e.g., anomalous, for a first type of process, while the first size may be anomalous and thus, abnormally large, for a second type of process. In third combination, a combination of a constant size and process type-specific sizes may be utilized. When the logic of the MAD system 100 determines an abnormally large memory region has been allocated to the process (yes at block 302), the abnormally large memory region is divided into a plurality of smaller regions (block 303) and proceeds to block 305. In one embodiment, one or more of the plurality of smaller regions may have corresponding sizes, e.g., the abnormally large memory may be divided in even chunks (or divided as evenly as possible).

When the logic of the MAD system 100 determines an abnormally large memory region has not been allocated to the process (no at block 302), the logic of the MAD system 100 determines whether at least a threshold number of memory regions have been allocated for the process with corresponding sizes (block 304). When less than a threshold number of memory regions having corresponding sizes have been allocated for the process (no at block 304), the method 300 returns to block 301. When at least a threshold number of memory regions having corresponding sizes have been allocated for the process (yes at block 304), the method proceeds to block 305.

At block 305, the logic of the MAD system 100 selects a subset of memory regions for further processing. In one embodiment, the number of regions included in the subset may be a predetermined percentage of the number of regions available for selection (e.g., each of the plurality of smaller regions of the abnormally large memory region (block 303) or each of the memory regions allocated having corresponding sizes (block 304)). In a second embodiment, the number of regions included in the subset may be a predefined number. In yet another embodiment, all available memory regions may be included within the selected subset.

At block 306, logic of the MAD system 100 performs a similarity analysis on at least a portion of one or more of the selected subset of memory regions. In one embodiment, the similarity analysis is performed on the entirety of the content within each memory region with the selected subset. In a second embodiment, the similarity analysis may be performed on a percentage (e.g., less than the entirety) of the content within each memory region. Additionally, in at least either embodiment, one or more memory regions of the selected subset may not be included within the similarity analysis operations.

At block 307, which, in one embodiment, occurs concurrently in time with the operations of block 306, the logic of the MAD system 100 performs a data frequency analysis on at least a portion of one or more memory regions of the selected subset.

As discussed above, the logic of the MAD system 100 may generate a report including the results of the similarity analysis and/or the data frequency analysis and provide the report to one or more network devices, one or more administrators, cloud computing services (e.g., for further analysis and incorporation into updates) and/or store the results in a persistent storage.

Figure 4:
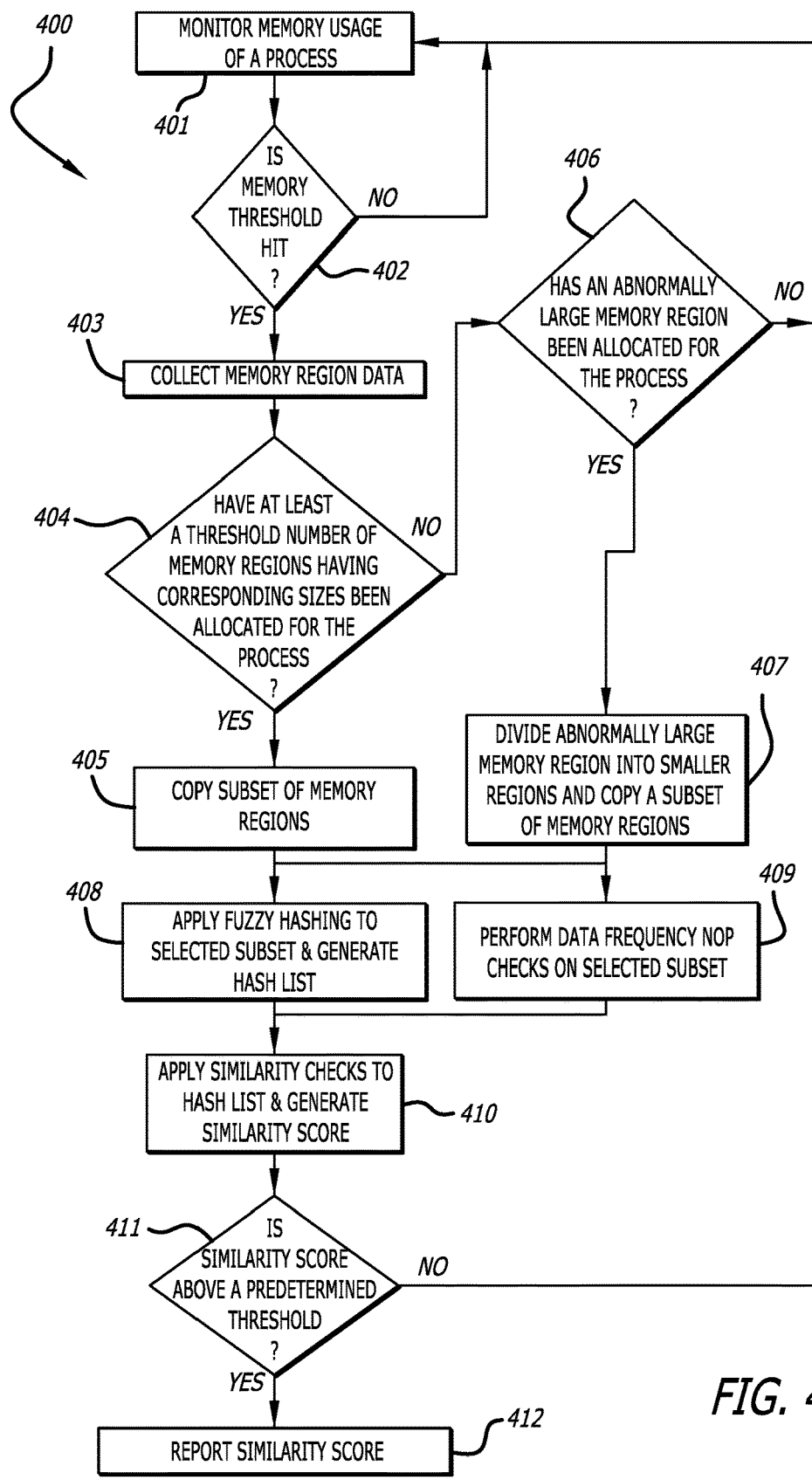
FIG. 4 is a flowchart illustrating a second exemplary method for detecting a heap spray attack using a virtual machine to process a suspicious object within the memory anomaly detection system of FIG. 1.

FIG. 4 is a flowchart illustrating a second exemplary method for detecting a heap spray attack using a virtual machine to process a suspicious object within the memory anomaly detection system of FIG. 1. Each block illustrated in FIG. 4 represents an operation performed in the method 400 of detecting possible heap spray attacks with the MAD system 100 of FIG. 1. As discussed above with respect to FIG. 3, the MAD system 100 receives network traffic and passes an object to a virtual machine for processing and analysis. At block 401, logic within the MAD system 100 monitors the memory usage of a process that has been launched within the virtual machine. At block 402, logic within the MAD system 100 determines whether memory allocation for the process has exceeded a first memory threshold. For example, the first memory threshold may be a predefined size (e.g., in bytes) that has been determined (e.g., via previous analysis of memory allocations known to be associated with heap spray attacks) to be a minimum memory allocation for a process to have a likelihood of involvement with a heap spray attack. When the first memory threshold has not been exceeded, the method 400 returns to block 401.

When the first memory threshold has been exceeded, logic of the MAD system 100 collects memory region data (block 403). The memory region data includes, but is not limited or restricted to, a total number of memory regions, and/or a data structure that may include base addresses, allocation size, memory state, protection information and type of memory.

At block 404, logic of the MAD system 100 determines whether at least a threshold number of memory regions have been allocated for the process wherein each memory region has corresponding sizes. When at least a threshold number of memory regions have been allocated having corresponding sizes for the process (yes at block 404), the logic of the MAD system 100 selects a subset of memory regions for further processing and the method 400 proceeds to blocks 408 and 409, the operations of which may be performed concurrently. When less than a threshold number of memory regions having corresponding sizes have been allocated for the process (no at block 404), logic of the MAD system 100 determines whether an abnormally large memory region has been allocated for the process (block 406).

When the logic of the MAD system 100 determines an abnormally large memory region has not been allocated to the process (no at block 406), the method 400 returns to block 401. When the logic of the MAD system 100 determines an abnormally large memory region has been allocated to the process (yes at block 406), the abnormally large memory region is divided into a plurality of smaller regions (block 407) and the method 400 proceeds to blocks 408 and 409, the operations of which may be performed concurrently.

At block 408, a fuzzy hash is performed on at least a portion of the selected subset (e.g., two or more memory regions), wherein performing the fuzzy hash includes generating a hash for each memory region, wherein each hash is an entry within a hash list. The operations of block 409 may be performed concurrently in time with the operations of block 408 and include the logic of the MAD system 100 performing a data frequency analysis on at least a portion of one or more memory regions of the selected subset, as discussed above. Following the application of the fuzzy hash at block 408 and/or the performance of the data frequency analysis at block 409, logic of the MAD system 100 performs a similarity analysis on the entries in the hash list and generates a similarity score (block 410).

At block 411, the logic of the MAD system 100 determines whether the generated similarity score meets or exceeds a predetermined threshold, and if so, generates a report including at least information identifying the corresponding object and the similarity score (block 412). When the generated similarity score does not meet or exceed a predetermined threshold (no at block 411), the method 400 returns to block 401.

In the foregoing description, the invention is described with reference to specific exemplary embodiments thereof. It will, however, be evident that various modifications and changes may be made thereto without departing from the broader spirit and scope of the invention as set forth in the appended claims. As mentioned above, while specific embodiments are described herein, the invention is not to be limited to these embodiments, the invention is to be understood as not limited by the specific embodiments described herein, but only by scope of the appended claims. Features and details from one or more described embodiments may also be combined, added or removed to form other embodiments within the scope of the invention, as the described embodiments are merely exemplary of various features.

What is claimed is:

1. A non-transitory storage medium having stored thereon logic, the logic being executable by one or more processors to perform operations for heap spray detection including:

monitoring memory allocation for a process running during processing of an object;

responsive to detecting the memory allocation has exceeded a first memory threshold, determining whether (i) a memory region having a size greater than a second memory threshold being different than the first memory threshold has been allocated for the process, or (ii) at least a threshold number of memory regions having corresponding sizes has been allocated for the process;

selecting a subset of either (i) the memory region having a size greater than the second memory threshold or (ii) the memory regions having corresponding sizes; and performing a similarity analysis on at least a portion of the selected subset, the similarity analysis to generate a similarity score based on a plurality of hash values associated with either portions of the subset of the memory region or the memory regions having corresponding sizes, the similarity score to indicate whether the object is associated with a heap spray attack.

2. The storage medium of claim 1, wherein a corresponding size includes either (1) an exact same size wherein two memory regions include a same number of bytes, or (2) a size wherein a first number of bytes included in a first memory region is within a predetermined threshold of the number of bytes included in a second memory region.

3. The storage medium of claim 1, wherein the processing of the object and monitoring of the memory allocation for the process is done in a virtual machine.

4. The storage medium of claim 1, wherein the instructions being executable by the one or more processors to perform operations further including:
performing a data frequency analysis on at least a second portion of the selected subset to detect a repeating pattern.

5. The storage medium of claim 4, wherein the performing of (i) the data frequency analysis and (ii) the similarity analysis occurs at least partially overlapping in time.

6. The storage medium of claim 1, wherein the instructions being executable by the one or more processors to perform operations further including:
responsive to detecting the memory region having the size greater than the second memory threshold has been allocated for the process, dividing the memory region having the size greater than the second memory threshold into a plurality of smaller regions having a second same size.

7. The storage medium of claim 1, wherein the selected subset includes a first grouping of the plurality of smaller regions.

8. The storage medium of claim 1, wherein the instructions being executable by the one or more processors to perform operations further including:
responsive to the similarity score exceeding the score threshold, generating a report including information associated with the memory allocation for the process.

9. The storage medium of claim 1, wherein the similarity analysis includes (i) performing a fuzzy hash to generate a hash list, and (ii) applying one or more similarity checks to one or more entries in the hash list.

10. A computerized method for detecting a heap spray attack, the method comprising:
monitoring memory allocation for a process running within a runtime environment established by a network device that is processing an object;
responsive to detecting the memory allocation has exceeded a first memory threshold, determining whether (i) a memory region having a size greater than a second memory threshold being different than the first memory threshold and allocated for the process, or (ii) at least a threshold number of memory regions having corresponding sizes has been allocated for the process;
selecting a subset of either (i) the memory region having a size greater than the second memory threshold or (ii) the memory regions having corresponding sizes; and
performing a similarity analysis on at least a portion of the selected subset, the similarity analysis to generate a similarity score based on a plurality of hash values associated with either portions of the subset of the memory region or the memory regions having corresponding sizes, the similarity score to indicate whether the object is associated with a heap spray attack.

11. The method of claim 10, wherein a corresponding size includes either (1) an exact same size wherein two memory regions include a same number of bytes, or (2) a size wherein a first number of bytes included in a first memory region is within a predetermined threshold of the number of bytes included in a second memory region.

12. The method of claim 10, wherein the processing of the object and monitoring of the memory allocation for the process is done in a virtual machine.

13. The method of claim 10, further comprising:
performing a data frequency analysis on at least a second portion of the selected subset to detect a repeating pattern.

14. The method of claim 13, wherein the performing of (i) the data frequency analysis and (ii) the similarity analysis occurs at least partially overlapping in time.

15. The method of claim 10, wherein the instructions being executable by the one or more processors to perform operations further including:
responsive to detecting the memory region having the size greater than the second memory threshold has been allocated for the process, dividing the memory region having the size greater than the second memory threshold into a plurality of smaller regions having a second same size.

16. The method of claim 10, wherein the selected subset includes a first grouping of the plurality of smaller regions.

17. The method of claim 10, wherein the instructions being executable by the one or more processors to perform operations further including:
responsive to the similarity score exceeding the score threshold, generate a report including information associated with the memory allocation for the process.

18. The method of claim 10, wherein the similarity analysis includes (i) performing a fuzzy hash to generate a hash list, and (ii) applying one or more similarity checks to one or more entries in the hash list.

19. An electronic device comprising:
one or more processors;
a storage device communicatively coupled to the one or more processors and storing logic, the logic being executable by the one or more processors to perform operations including:
monitoring memory allocation for a process running within a virtual machine that is processing an object;
responsive to detecting the memory allocation has exceeded a first memory threshold, determining whether (i) a memory region having a size greater than a second memory threshold different than the first memory threshold has been allocated for the process, or (ii) at least a threshold number of memory regions having corresponding sizes has been allocated for the process;
selecting a subset of either (i) the memory region having a size greater than the second memory threshold or (ii) the memory regions having corresponding sizes; and
performing a similarity analysis on at least a portion of the selected subset, the similarity analysis to generate a similarity score based on a plurality of hash values associated with either portions of the selected subset of the memory region or the memory regions having corresponding sizes, the similarity score to indicate whether the object is associated with a heap spray attack.

20. The electronic device of claim 19, wherein a corresponding size includes either (1) an exact same size wherein two memory regions include a same number of bytes, or (2) a size wherein a first number of bytes included in a first memory region is within a predetermined threshold of the number of bytes included in a second memory region.

21. The electronic device of claim 19, wherein the instructions being executable by the one or more processors to perform operations further including:
    performing a data frequency analysis on at least a second portion of the selected subset to detect a repeating pattern.

22. The electronic device of claim 21, wherein the performing of (i) the data frequency analysis and (ii) the similarity analysis occurs at least partially overlapping in time.

23. The electronic device of claim 19, wherein the instructions being executable by the one or more processors to perform operations further including:
    responsive to detecting the memory region having the size greater than the second memory threshold has been allocated for the process, dividing the memory region having the size greater than the second memory threshold into a plurality of smaller regions having a second same size.

24. The electronic device of claim 19, wherein the selected subset includes a first grouping of the plurality of smaller regions.

25. The electronic device of claim 19, wherein the instructions being executable by the one or more processors to perform operations further including:
    responsive to the similarity score exceeding the score threshold, generating a report including information associated with the memory allocation for the process.

26. The electronic device of claim 19, wherein the similarity analysis includes (i) performing a fuzzy hash to generate a hash list, and (ii) applying one or more similarity checks to one or more entries in the hash list.

* * * * *